May 3, 1960 F. K. H. NALLINGER 2,935,149
SUSPENSION OF A DRIVE AGGREGATE IN A MOTOR VEHICLE
Filed March 26, 1956 3 Sheets-Sheet 1
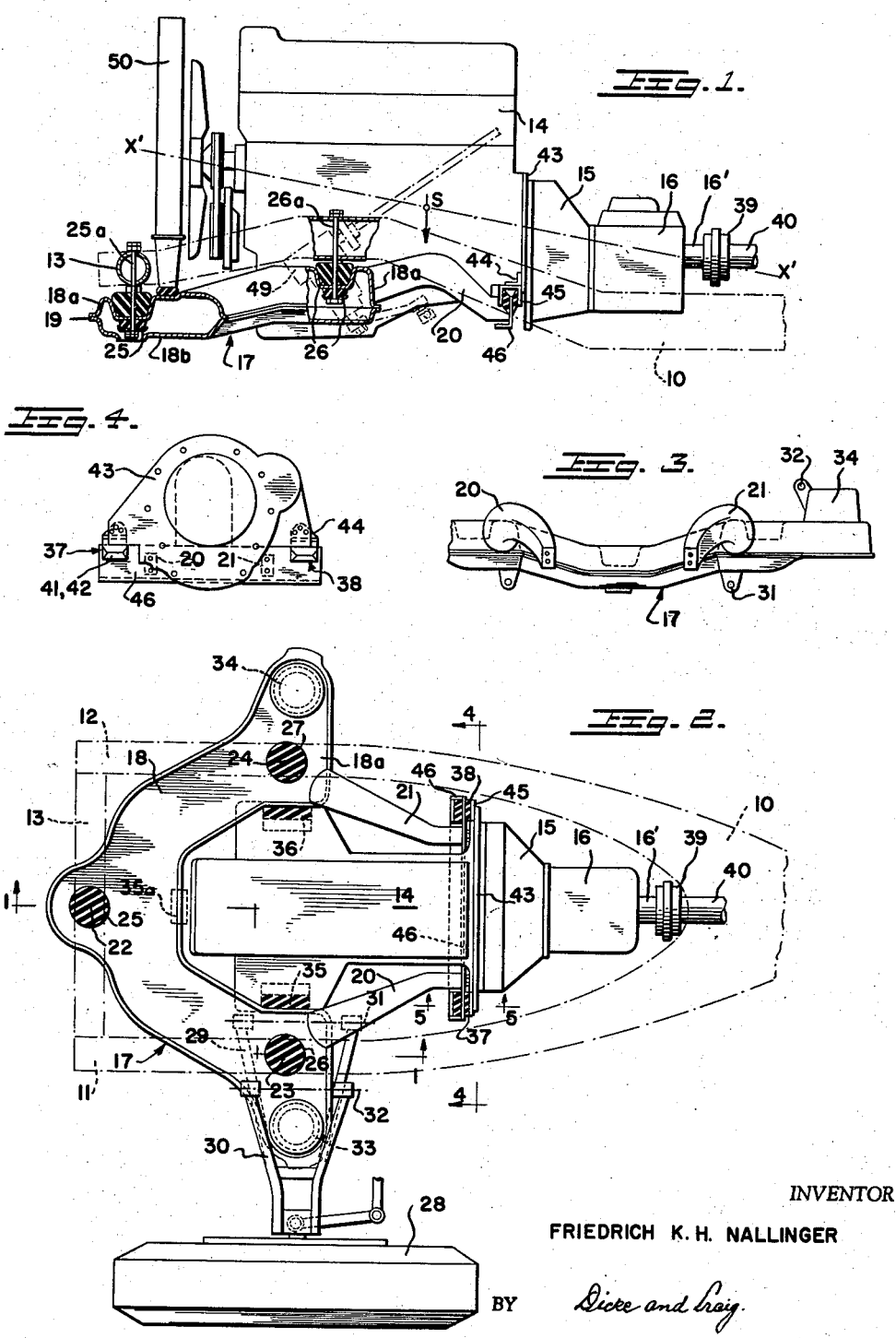
INVENTOR
FRIEDRICH K. H. NALLINGER
BY Dicke and Craig
ATTORNEYS

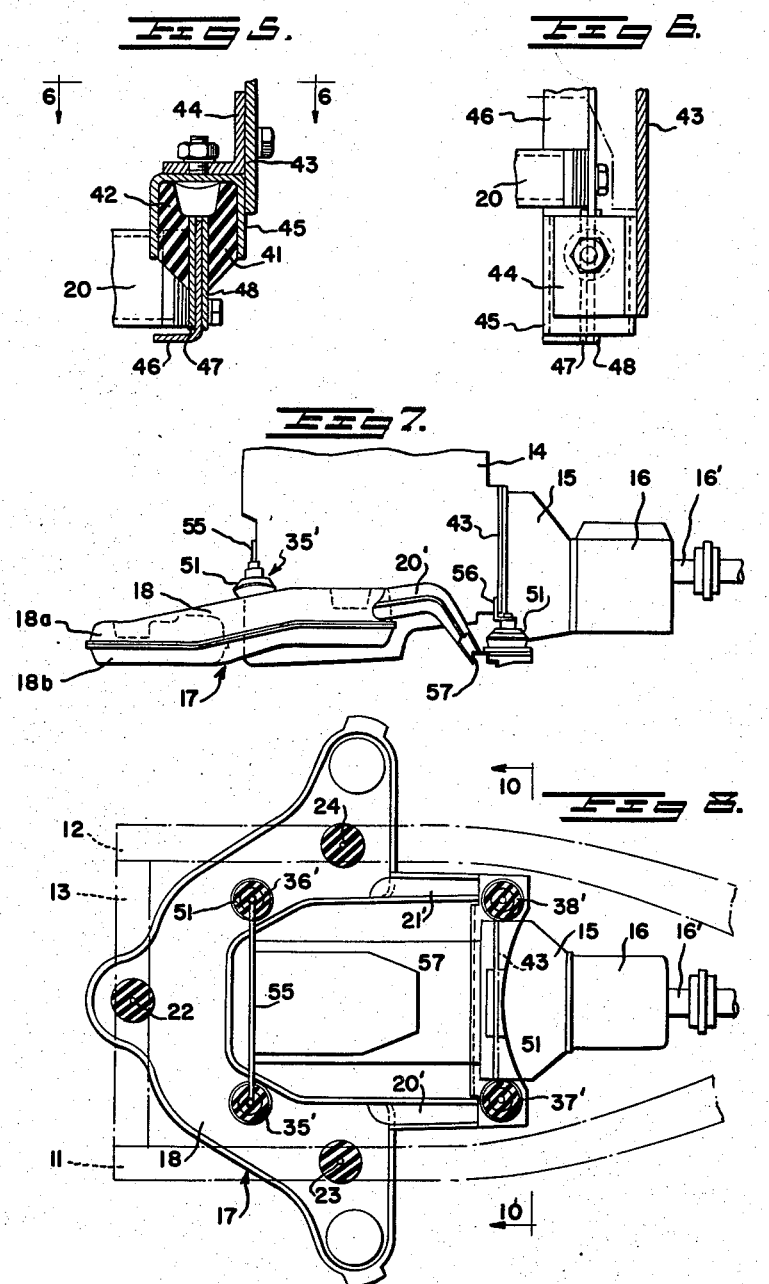

May 3, 1960     F. K. H. NALLINGER     2,935,149
SUSPENSION OF A DRIVE AGGREGATE IN A MOTOR VEHICLE
Filed March 26, 1956     3 Sheets-Sheet 3
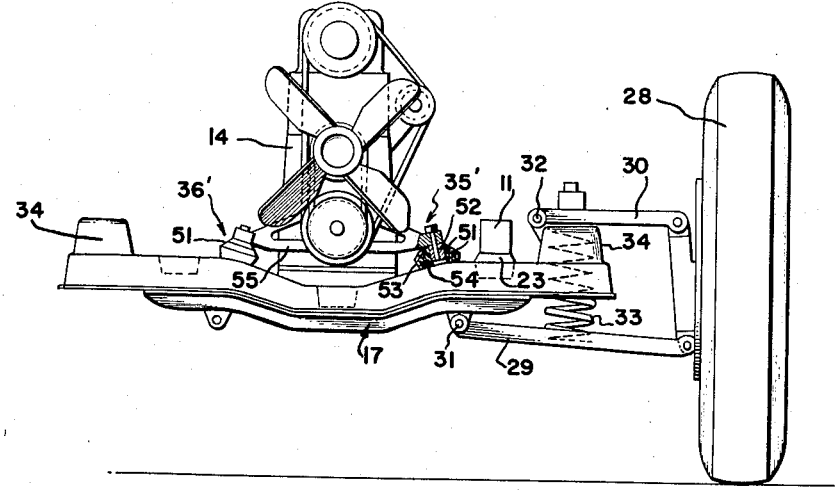
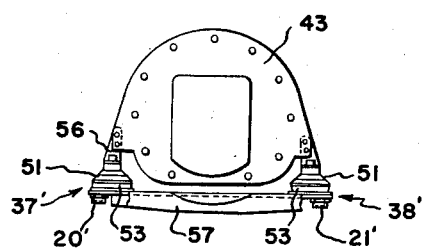
INVENTOR
FRIEDRICH K. H. NALLINGER
BY    *Dicke and Craig*
ATTORNEYS

United States Patent Office 2,935,149
Patented May 3, 1960

---

2,935,149

SUSPENSION OF A DRIVE AGGREGATE IN A MOTOR VEHICLE

Friedrich K. H. Nallinger, Stuttgart, Germany, assignor to Daimler-Benz Aktiengesellschaft, Stuttgart-Untertuerkheim, Germany Application March 26, 1956, Serial No. 573,807

Claims priority, application Germany March 31, 1955

16 Claims. (Cl. 180—64)

The present invention relates to the suspension of a drive aggregate, especially to the suspension of a drive-axle aggregate, in a motor vehicle by the use of an auxiliary frame on which the drive aggregate is supported, preferably elastically, for example, in rubber bearings, and which auxiliary frame in its turn is suspended at the vehicle superstructure, preferably also elastically, for example, in rubber bearings and the leg portions of which preferably serve for the suspension and the spring support of the wheels.

Accordingly, it is an object of the present invention to provide a suspension of a drive aggregate which permits facilitated assembly of the drive aggregate, auxiliary frame and wheel suspension.

Another object of the present invention is to provide such a support of the drive aggregate as to substantially completely eliminate noises and vibrations originating at the engine from being transmitted to the vehicle body.

Another object of the present invention resides in the provision of an auxiliary frame which permits the support of the full weight of the drive aggregate on the auxiliary frame in such a manner as to absorb favorably the forces acting on the drive aggregate, particularly by providing widely spaced bearing supports.

Still another object of the present invention is the provision of an auxiliary frame which may be readily manufactured of stamped or pressed sheet metal parts without any difficulties and which is provided with special extensions of preferably tubular shape, in which the stress is evenly distributed.

Still a further object of the present invention resides in the provision of an auxiliary frame which may be readily manufactured without excessive costs and which may be used for different types and sizes of engines by the use of different extensions suitably attached to the standard sheet metal parts of the auxiliary frame.

A still further object of the present invention is the provision of an auxiliary frame of small dimension accompanied by ease of manufacture thereof which frame is relatively rigid in itself and which is provided with means, preferably in the form of a reinforcing cross member or plate, to reinforce the special extensions attached to the ends of the auxiliary frame.

Another object of the present invention is the provision of an auxiliary frame adapted to support thereon the full weight of the drive aggregate which is so constructed as to facilitate assembly thereof with the superstructure of the vehicle.

A still further object of the present invention resides in the provision and construction of the mounting means for the drive aggregate on an auxiliary frame with the entire weight of the drive aggregate supported on the auxiliary frame and in which elastic means such as rubber blocks or rings which are stressed or loaded in shear by the weight of the drive aggregate are utilized to transmit the weight thereof directly to the road wheels, preferably with a lever-up ratio.

The present invention is directed to a support of a drive aggregate wherein the forces which act on the engine may be absorbed at widely spaced support points. The support consists essentially of a horseshoe-shaped or fork-shaped auxiliary frame. The auxiliary frame surrounds the drive aggregate with its leg portions or fork-arm portions for the partial support of the drive aggregate on one side thereof. The ends of the fork or leg portions of the auxiliary frame are provided with special extensions on which the drive aggregate is supported on the other side thereof.

The auxiliary frame may preferably be made of stamped or pressed sheet metal parts. Tubular extensions which taper off or decrease in diameter toward the ends thereof are preferably welded to one of the two dish-shaped stamped sheet metal parts forming the auxiliary frame. An advantage of this preferred construction resides in the relatively small size of the auxiliary frame for simplicity of manufacture. A further advantage of the novel auxiliary frame results from the fact that it is easily adaptable for use with various sizes of engines or drive aggregates by merely changing the lengths of the tubular extensions.

Moreover, a very rigid auxiliary frame is obtained by means of rigidly or detachably securing a cross member to the tubular extension ends.

The very nature of the novel auxiliary frame permits its assembly with or emplacement over the drive aggregate. The open end of the horseshoe-shaped auxiliary frame may be at the front or the rear of the drive aggregate. Alternatively, the auxiliary frame may be placed below the drive aggregate, especially with a cross member rigidly connected with the auxiliary frame extensions.

The auxiliary frame together with the drive aggregate and the wheels spring suspended near the base of the horseshoe portion of the auxiliary frame may be secured from below to the vehicle superstructure, i.e., to the main chassis frame or to the chassis of a self-supporting vehicle body.

An additional advantage is obtained from a lever-up ratio effective directly on the wheel suspension carried by the horseshoe-shaped portion of the auxiliary frame since the drive aggregate center of gravity lies in the region of the auxiliary frame extensions.

The support of the drive aggregate takes place at three or four points on the auxiliary frame. The forward support points are preferably within the central area of the U-shaped auxiliary frame. Rubber supports or bearings of a particularly soft elastic nature are provided in the form of blocks or annular members loaded in shear by the drive aggregate weight.

An especially simple and appropriate drive aggregate support on the auxiliary frame extension is provided by means of a transversely extending support plate inserted between the engine and the clutch housing and, if desired, between the clutch housing and the transmission. The metal parts of the rubber bearing can thereby be bolted to the transverse plate.

These and further objects, features and advantages of the present invention will become more obvious from the following description when taken in connection with the accompanying drawing which shows, for purposes of illustration only, several preferred embodiments in accordance with the present invention and wherein:

Figure 1 is a broken away cross sectional view of a support of the drive aggregate on an auxiliary frame in accordance with the present invention taken along line 1—1 of Figure 2.

Figure 2 is a plan view of the drive aggregate and auxiliary frame illustrated in Figure 1.

Figure 3 is a rear view of the auxiliary frame.

Figure 4 is a cross sectional view of the drive aggregate illustrating the rear support thereof in accordance with the present invention and taken along line 4—4 of Figure 2.

Figure 5 is a cross sectional detailed view of the rubber connection according to Figure 6 and line 5—5 of Figure 2.

Figure 6 is a plan view of Figure 5.

Figure 7 is a side view of a still further embodiment of a drive aggregate and auxiliary frame therefor in accordance with the present invention similar to Figure 1.

Figure 8 is a plan view of Figure 7.

Figure 9 is a front view of the drive aggregate and support therefor illustrated in Figures 7 and 8, and Figure 10 is a cross sectional view taken along line 10—10 of Figure 8.

The term "superstructure" is used hereinafter to designate a frame, chassis or body of a self-supporting vehicle body, while the term "drive aggregate" is used to designate the power unit or parts thereof consisting of the engine, flywheel housing, clutch and transmission.

Referring now more particularly to the drawing wherein like reference numerals are used throughout the various views to designate like parts, and more particularly to Figures 1 and 2, the main frame or chassis is designated by reference numeral 10 and is shown in the drawing in dot-and-dash lines. The main frame or chassis 10 forming part of the superstructure of the vehicle may be, for example, a fork-type frame with front fork-arms 11 and 12 and with a front cross bearer 13. The drive aggregate which consists of engine 14, the clutch and flywheel housing 15 and a change-speed gear or transmission 16 is supported on the vehicle superstructure or main frame 10 by the use of an auxiliary frame generally designated by reference numeral 17.

The auxiliary frame 17 consists of a main part 18 thereof, shaped, for example, approximately horseshoe-like which is composed of two correspondingly shaped complementary pressed metal parts 18a and 18b and combined into a hollow body, especially into a hollow body with an essentially horizontal joint 19. The auxiliary frame 17 further comprises tubular horn-like extensions 20 and 21 which are secured, for example, by welding to the rear end of the upper part 18a of the auxiliary frame. The tubular extensions 20 and 21 taper off from the points of the connections with the upper part 18a toward the ends thereof so that a bearer of essentially equal bending strength or tensile strength is formed thereby.

The auxiliary frame 17 is supported on the vehicle superstructure or main frame 10 at three points 22, 23 and 24 by the insertion of rubber buffers 25, 26 and 27 which are secured at the main frame 10, for example, by means of bolts 25a and 26a or are secured between the same and the auxiliary frame 17, possibly with some pre-stress.

The front wheels 28 are suspended at the auxiliary frame 17 by means of two superposed guide arms or links 29 and 30 which are pivotally supported at the auxiliary frame 17 in joints 31 and 32, and are sprung against the auxiliary frame 17 by means of helical springs 33 which are supported at the lower ends thereof against a cross member of the lower guide arm 29 and with the upper ends thereof against a bell-shaped housing 34 of the auxiliary frame 17. The drive aggregate 14, 15, 16 is supported, on the one hand, at its front end in rubber bearings 35 and 36 at the leg portions of the horseshoe shaped auxiliary frame 17, and, on the other, at the rear ends of the extension 21 and 22 on the auxiliary frame at points 37 and 38.

In the embodiment according to Figures 1 to 6, the rubber bearings 35 and 36 are disposed at an incline or formed essentially bow-shaped so that a preferred swinging axis $x'—x'$ of the drive aggregate is determined thereby which extends in the longitudinal direction of the vehicle and is preferably inclined in such a manner that it extends, on the one hand, through the center of gravity S of the drive aggregate and, on the other, through the center of the rear drive joint 39 which connects the transmission shaft 16' with the Cardan shaft 40 leading to the rear wheels.

Two rubber buffers 41 and 42 serve as rear support, as is particularly clearly shown in Figure 5, which may also be connected with each other, and which are arranged vertically in such a manner that they are loaded or stressed essentially in shear in the vertical direction. For that purpose an annularly shaped intermediate plate 43 (Figure 4) is inserted between the engine 14 and the clutch-fly wheel housing 15 which plate 43 is secured in its position by the bolts or screws which are used at the same time to normally connect the flanges of the two parts 14 and 15 with each other. Angle irons 44 are secured, for example, threadably, to the plate 43 on both sides of the engine while inverted U-shaped members 45 which are open at the lower side thereof are secured, for example, either by bolting or welding, to the lower side of the angle irons 44.

Furthermore, a reinforcing rail in the shape of an angle iron 46 which extends underneath the engine 14 is secured, for example, by bolting or welding, to the ends of the tubular extensions 20 and 21 which themselves are closed up, for example, by cover-like pieces welded thereto. The angle iron 46 projects toward the sides beyond the extensions 20 and 21 and serves for receiving the reinforcing plates 47 and 48 for the rubber blocks 41 and 42 which, on the one hand, are secured, for example, by vulcanizing, to these reinforcing plates 47, 48 and, on the other, to the downwardly directed leg portions of the U-shaped iron member 45 also by vulcanizing.

Moreover, the steering mechanism 49 as well as the cooler 50 are secured to the auxiliary frame preferably elastically, for example, by the insertion of rubber. The parts 45, 46, 47 and 48, together with the rubber blocks 41 and 42 and possibly also together with the angle iron 44 form a detachable unit which during the assembly of the drive aggregate onto the auxiliary frame may be inserted therebetween. These same parts 41, 42, 44, 45, 46, 47 and 48 which may thus be preassembled may also be connected prior to assembly with either the drive aggregate or the auxiliary frame as may be more appropriate. A rigid connection, for example, by means of a welded joint of the rail member 46 with the extensions 20 and 21 provides a particularly rigid auxiliary frame as a result of the mutual reinforcement of the extensions 20 and 21. In that case the parts 47 and 48 are appropriately bolted to the rail 46.

Furthermore, the support of the drive aggregate at the points 37 and 38 may take place in the same manner as the front support 35, 36 or vice versa, for example, in such a manner that rubber bearings are used also for the rear support the center points of which lie in or coincide with the swinging axis $x'—x'$.

The embodiment according to Figures 7 to 10 distinguishes itself from the embodiment described in connection with Figures 1 to 6 essentially by the fact that the drive aggregate is supported in the bearing points 35', 36', 37', 38' by means of rubber rings 51 (Figure 9), which are disposed, for example, between metal rings 52, 53 and 54 with which they are secured by vulcanizing and which are stressed in shear by the weight of the drive aggregate. The front rubber bearings are thereby positioned at a slight incline toward the inside and are secured at the engine by a common cross tie or cross member 55. As compared to the embodiment according to Figures 1 to 6, the front rubber bearings are moved forwardly still further in such a manner that they lie in the center between the points of suspension 22, 23 or 22, 24 of the auxiliary frame 17 on the main frame or superstructure 10.

The metal parts for the lower rubber bearings 51 of the suspension of the drive aggregate on the auxiliary frame which are shaped correspondingly are secured by means of appropriately shaped profile members 56, for example, by bolting to the bearer plate 43 which is inserted between the engine 14 and flywheel-clutch housing 15. On the other hand, these lower rubber bearings 51 are supported on a reinforcing rail 57 which may be arranged between extensions 20' and 21' in a manner corresponding to that of rail 46 and which connects the horn-like extensions 20 and 21 of the auxiliary frame 17 with one another.

In the embodiments illustrated herein the rubber bearings 35, 36 (or 35', 36') and 37, 38 (or 37', 38') are disposed on different sides of the center of gravity S. However, the arrangement may possibly also be made in such a manner that one of the pairs of the rubber bearings, for example, the rear rubber bearings, lie in proximity of the longitudinal plane going through the center of gravity. The points of support in front may possibly be replaced by a single point of support at the front end of the engine 14, for example, located approximately at 35a in Figure 2, in the center of the horseshoe shaped auxiliary frame 17. Instead of being arranged outside the extensions 20 and 21 (or 20' and 21') or on the same, the supporting points 37 and 38 (or 37' and 38') may also be provided on both sides of the engine intermediate the extensions 20 and 21.

By changing the shape and length of the extensions which are attached, especially welded, to the auxiliary stamped sheet metal frame 17, the auxiliary frame 17, even though of the same size, i.e., even though formed of the same stamped or pressed metal parts, may be used for different types of engines.

Moreover, instead of driving the rear wheels, the drive aggregate may also be used to drive the front wheels. Furthermore, a corresponding arrangement may also be provided for rear engines with a drive of the rear wheels or also of the front wheels. However, the arrangement is in each case realized in such a manner that the auxiliary frame may be assembled in the direction from the vehicle end toward the center of the vehicle over the drive aggregate.

The drive aggregate instead of including an engine, flywheel-clutch housing and change speed gear housing, may possibly also include only the engine housing or the engine housing and flywheel-clutch housing, as well as the axle drive gear in the case of an arrangement in which the wheels on both sides of the engine are driven wheels.

I claim:

1. In a motor vehicle with a vehicle superstructure, an auxiliary frame formed of two complementary stamped sheet metal parts having laterally spaced ends, a drive aggregate including an engine, tubular extensions welded to the ends of said auxiliary frame on both sides of said drive aggregate in cantilever fashion, means for supporting said vehicle superstructure on said auxiliary frame, and means for elastically supporting the full weight of said drive aggregate on said auxiliary frame, said last-named means including rubber buffers disposed in a transverse plane located near one end of the engine at the free ends of said extensions and subject to shearing stress.

2. In a motor vehicle a vehicle superstructure, an essentially U-shaped auxiliary frame including a U-shaped stamped sheet-metal part with tubular extensions secured to the leg portions of the auxiliary frame and a drive aggregate including an engine and a flywheel-clutch housing, means for elastically supporting said superstructure on said auxiliary frame at a plurality of points, and means for elastically supporting the entire weight of said drive aggregate on said auxiliary frame at a plurality of points, at least one of said last-mentioned points being disposed in a transverse plane disposed at the ends of said tubular extensions, said means for elastically supporting said drive aggregate on said auxiliary frame including an intermediate plate inserted into said drive aggregate transversely thereof and at the ends of said tubular extensions.

3. In a motor vehicle with a vehicle superstructure, an auxiliary frame and a drive aggregate, tubular extensions secured to the ends of said auxiliary frame on both sides of said drive aggregate, means for elastically supporting said vehicle superstructure on said auxiliary frame, and means for elastically supporting the full weight of said drive aggregate on said auxiliary frame, said last-named means including rubber buffers disposed both in the longitudinal direction of the vehicle to determine a longitudinal axis of rotation of said drive aggregate and transversely in a cross plane through the ends of said tubular extensions.

4. In a motor vehicle a vehicle superstructure, an auxiliary frame having leg portions with tubular extensions secured to the leg portions of the auxiliary frame and a drive aggregate including an engine, means for elastically supporting said auxiliary frame on said superstructure at a plurality of points, and means for elastically supporting the entire weight of said drive aggregate on said auxiliary frame at a plurality of points, two of said last-mentioned points being disposed in a transverse plane disposed near one end of said engine, said means for supporting said drive aggregate on said auxiliary frame including a reinforcing member at the ends of said tubular extensions and interconnecting the latter to reinforce each other and near said one end of said engine, a plurality of rubber buffers, a first bearing part and a second bearing part for accommodating said rubber buffers therebetween, one of said first and second parts being secured to each end of said tubular extensions, and the other of said first and second parts being secured to said reinforcing member on both sides thereof, said rubber buffers being secured to said parts to be subjected to shearing stress by the weight of said drive aggregate.

5. In a motor vehicle with a superstructure, a driving aggregate comprising a driving engine, an auxiliary frame comprising an essentially U-shaped metal stamping, said stamping embracing said driving engine and having a plurality of bearer extensions secured to the ends of said metal stamping on either side of said driving engine, first support means for supporting said driving engine on said metal stamping, second support means for supporting said driving engine on said plurality of bearer extensions at points thereon remote from the stamping, and third support means for supporting said superstructure of said motor vehicle on said auxiliary frame.

6. In a motor vehicle the combination according to claim 5, wherein said bearer extensions are tubular.

7. In a motor vehicle the combination according to claim 5, wherein said auxiliary frame is comprised of two complementary metal stampings secured together for forming a hollow cross-section.

8. In a motor vehicle the combination according to claim 5, wherein said first support means, said second support means, and said third support means include resilient buffers for cushioning forces between the respective parts interconnected thereby.

9. In a motor vehicle the combination according to claim 5, wherein said third support means comprises rubber buffer means located in a central portion of said essentially U-shaped metal stamping and in juxtaposition with the ends thereof.

10. In a motor vehicle the combination according to claim 5, further comprising road wheels on opposite sides of said engine, and means for suspending and springing said road wheels from said auxiliary frame on the ends of said essentially U-shaped metal stamping.

11. In a motor vehicle the combination according to claim 5, wherein said driving aggregate comprises an engine and a flywheel-clutch housing and said second support means includes an intermediate plate inserted in said driving aggregate intermediate said engine and said flywheel-clutch housing and supported at said points on the bearer extensions remote from the U-shaped stamping.

12. In a motor vehicle the combination according to claim 5, wherein said first support means includes a plurality of annularly shaped rubber buffers provided with inclined axes converging thereabove, said second support means including rubber buffers spaced from said first support means longitudinally of the vehicle and near one end of the engine and provided with essentially vertical axes.

13. In a motor vehicle the combination according to claim 5, wherein said second support means includes a transversely extending reinforcing member, said reinforcing member interconnecting the ends of said bearer extensions remote from said stamping to reinforce them relative to each other.

14. In a motor vehicle the combination according to claim 6, wherein said tubular extensions decrease in cross section towards the ends thereof to provide essentially constant bending strength over the entire length thereof.

15. In a motor vehicle the combination according to claim 6, wherein said auxiliary frame is essentially horseshoe shaped, and wherein the center of gravity of said drive aggregate is located in the longitudinal direction of the vehicle between the ends of the leg portions of said horseshoe shaped auxiliary frame and the ends of said tubular extensions.

16. In a motor vehicle with a vehicle superstructure, an auxiliary frame having a relatively heavy main portion elastically supported relative to and intermediate both the vehicle superstructure and the vehicle road wheels, a drive aggregate including an engine, a plurality of bearer extensions secured to said main auxiliary frame portion and extending therefrom longitudinally of the vehicle on opposite sides of the drive aggregate, means for elastically supporting the full weight of said drive aggregate on said auxiliary frame at a plurality of points, said last-named means including rubber buffers disposed in a transverse plane located near one end of the engine adjacent ends of said bearer extensions remote from said main portion of the auxiliary frame, and means for elastically supporting said vehicle superstructure on said main portion of the auxiliary frame.

References Cited in the file of this patent

UNITED STATES PATENTS

| | | |
|---|---|---|
| 2,044,714 | Trott | June 6, 1936 |
| 2,374,533 | Fulton | Apr. 24, 1945 |
| 2,689,014 | Nallinger | Sept. 14, 1954 |
| 2,708,003 | Nallinger | May 10, 1955 |

FOREIGN PATENTS

| | | |
|---|---|---|
| 662,538 | Great Britain | Dec. 5, 1951 |